United States Patent
Lin et al.

(10) Patent No.: US 11,262,870 B2
(45) Date of Patent: Mar. 1, 2022

(54) TOUCH SENSING DEVICE AND DRIVING METHOD FOR DRIVING TOUCH SENSING DEVICE

(71) Applicant: Novatek Microelectronics Corp., Hsinchu (TW)

(72) Inventors: Yi-Ying Lin, Hualien County (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 8 days.

(21) Appl. No.: 16/884,056

(22) Filed: May 27, 2020

(65) Prior Publication Data

US 2021/0157439 A1    May 27, 2021

Related U.S. Application Data

(60) Provisional application No. 62/940,258, filed on Nov. 26, 2019.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 2203/04105* (2013.01)

(58) Field of Classification Search
CPC ............... G06F 3/0418; G06F 3/044; G06F 2203/04105
See application file for complete search history.

(56) References Cited

U.S. PATENT DOCUMENTS

| 9,798,416 B2 | 10/2017 | Hsiao et al. |
| 10,353,505 B2 | 7/2019 | Liu et al. |
| 2017/0068368 A1 | 3/2017 | Hsiao et al. |
| 2017/0068384 A1 | 3/2017 | Kim et al. |

FOREIGN PATENT DOCUMENTS

| CN | 102713805 A | * | 10/2012 | ............. G06F 3/041 |
| CN | 105911736 | | 8/2016 | |
| CN | 106502444 | | 3/2017 | |
| CN | 107168575 | | 9/2017 | |
| TW | 201543303 | | 11/2015 | |
| WO | WO-2016142004 A1 | * | 9/2016 | ........... G06F 3/0443 |

OTHER PUBLICATIONS

"Office Action of Taiwan Counterpart Application", dated Mar. 24, 2021, p. 1-p. 13.

* cited by examiner

*Primary Examiner* — Michael Pervan
(74) *Attorney, Agent, or Firm* — JCIPRNET (57) ABSTRACT

A touch sensing device and a driving method for driving the touch sensing device are provided. The touch sensing device includes a plurality of electrodes and a driving circuit. The electrodes includes a touch sensing electrode and a force sensing electrode. During a touch sensing driving period, the driving circuit provides a first driving signal to one of the touch sensing electrode and the force sensing electrode, provides a second driving signal to another one of the touch sensing electrode and the force sensing electrode or controls the another one of the touch sensing electrode and the force sensing electrode to enter a floating state.

17 Claims, 5 Drawing Sheets

```
┌─────────────────────────────────────────┐
│ performing touch sensing by a touch sensing electrode │
│ during a touch sensing driving period for determining a │
│ result of the touch sensing, wherein a first driving signal │──S410
│ is provided to one of the touch sensing electrode and │
│ the force sensing electrode │
└─────────────────────────────────────────┘
                    ↓
┌─────────────────────────────────────────┐
│ performing force sensing by the force sensing electrode │
│ during the touch sensing driving period for determining a │
│ result of the force sensing, wherein a second driving │
│ signal is provided to another one of the touch sensing │──S420
│ electrode and the force sensing electrode or the another │
│ one of the touch sensing electrode and the force sensing │
│ electrode is controlled to enter a floating state │
└─────────────────────────────────────────┘
                    ↓
┌─────────────────────────────────────────┐
│ providing a fixed-value voltage signal to a reference │──S430
│ voltage electrode during the touch sensing driving period │
└─────────────────────────────────────────┘
```

TOUCH SENSING DEVICE AND DRIVING METHOD FOR DRIVING TOUCH SENSING DEVICE

CROSS-REFERENCE TO RELATED APPLICATION

This application claims the priority benefit of U.S. provisional application Ser. No. 62/940,258, filed on Nov. 26, 2019. The entirety of the above-mentioned patent application is hereby incorporated by reference herein and made a part of this specification.

BACKGROUND

Technical Field

The invention relates to a touch sensing technique, and more particularly to a touch sensing device and a driving method for a touch sensing device.

Description of Related Art

The additional installation of a force sensor on electronic devices (such as mobile phones, tablets, notebook computers, or other consumer electronic devices) is becoming a trend for novel control methods. Users can use the force sensor and the touch sensor to help control the electronic devices. In detail, the mobile devices may prevent accidental touch of the touch sensor detected by the force sensor simultaneously.

At present, the force sensor and the touch sensor are layered on each other on the same area on the display screen or the electronic device. However, because of the interference between the touch sensor layer and the force sensor layer, the sensitivity of the signals of the touch sensor and the force sensor will be greatly reduced or interfered, thus the function of preventing accidental touch may not easy to implement.

SUMMARY

The invention provides a touch sensing device and a driving method for a touch sensing device to reduce a parasitic capacitance between the touch sensor layer and the force sensor layer when driving the touch sensor layer and the force sensor layer at the same time, so as to reduce the interference between the touch sensor layer and the force sensor, increase the sensitivity of the signals of the touch sensor and the force sensor, and improve the function for of preventing accidental touch.

The touch sensing device of an embodiment of the invention includes a plurality of electrodes and a driving circuit. The plurality of electrodes include a touch sensing electrode and a force sensing electrode. The force sensing electrode is adjacently coupled to the touch sensing electrode. The driving circuit is coupled to the touch sensing electrode and the force sensing electrode. The driving circuit performs touch sensing by the touch sensing electrode during a touch sensing driving period for determining a result of the touch sensing, and performs force sensing by the force sensing electrode during the touch sensing driving period for determining a result of the force sensing. During the touch sensing driving period, the driving circuit provides a first driving signal to one of the touch sensing electrode and the force sensing electrode, provides a second driving signal to another one of the touch sensing electrode and the force sensing electrode or controls the another one of the touch sensing electrode and the force sensing electrode to enter a floating state.

The driving method for driving a touch sensing device of an embodiment of the invention is provided. The touch sensing device includes at least a plurality of electrodes, the electrodes include a touch sensing electrode and a force sensing electrode. The driving method includes the following steps. Touch sensing is performed by the touch sensing electrode during a touch sensing driving period for determining a result of the touch sensing. And, force sensing is performed by the force sensing electrode during the touch sensing driving period for determining a result of the force sensing. During the touch sensing driving period, a first driving signal is provided to one of the touch sensing electrode and the force sensing electrode, a second driving signal is provided to another one of the touch sensing electrode and the force sensing electrode or the another one of the touch sensing electrode and the force sensing electrode is controlled to enter a floating state.

Based on the above, a touch sensing device and a driving method for a touch sensing device of embodiments of the invention determine that a finger of a user touches the touch sensing device according to whether a result of the force sensing performed by a force sensor in response to determine that the result of the touch sensing has an touch induction amount, and ignore the result of the touch sensing and determines that the finger of the user does not touch the touch sensing device in response to determine that the result of the force sensing does not have the force induction amount. And, when driving the touch sensor layer of the touch sensor and the force sensor layer of the touch sensor at the same time, a parasitic capacitance between the touch sensor layer and the force sensor layer is reduced by adjusting driving signals of the force sensor layer and the touch sensor layer. Therefore, in the present embodiment, the interference between the touch sensor layer and the force sensor is reduced, the sensitivity of the signals of the touch sensor and the force sensor is increased, and the function for of preventing accidental touch is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
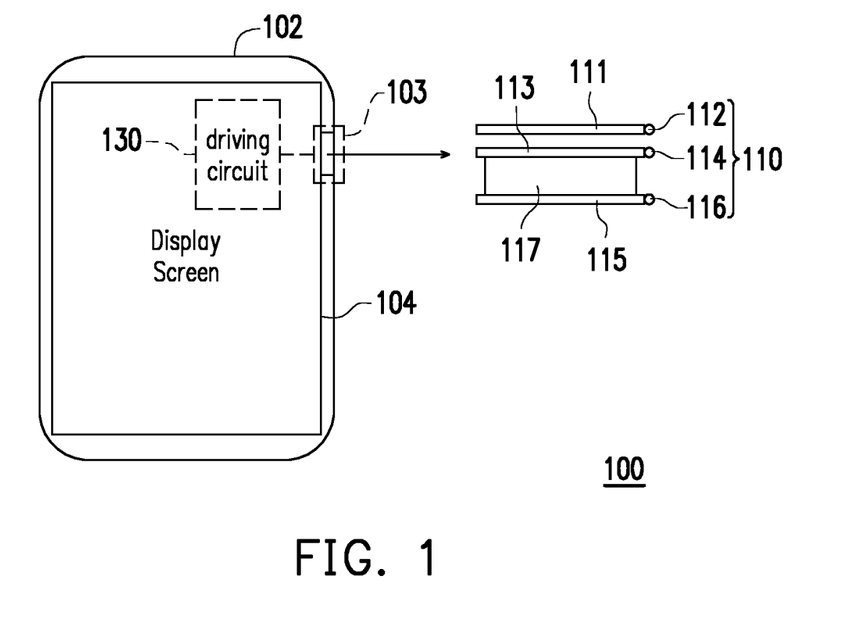
FIG. 1 is a schematic diagram of a touch sensing device according to a first embodiment of the invention.
Figure 2:
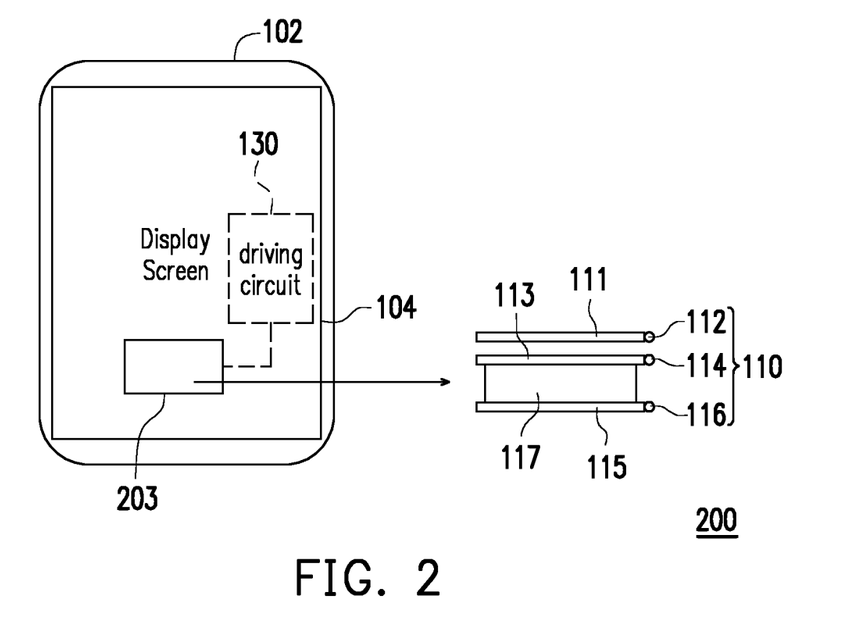
FIG. 2 is a schematic diagram of a touch sensing device according to a second embodiment of the invention.

FIG. 1 is a schematic diagram of a touch sensing device 100 according to a first embodiment of the invention. FIG. 2 is a schematic diagram of a touch sensing device 200 according to a second embodiment of the invention. The touch sensing devices 100 and 200 in FIGS. 1 and 2 may be applied to various electronic devices, such as a mobile phone, a tablet computer, a notebook computer, a multimedia player, or other consumer electronic device.

In FIG. 1, the electronic device includes a touch sensing device 100, a body 102, and a display screen 104. The touch sensing device 100 includes a driving circuit 130 and a plurality of electrodes 110 with a plurality of layers. The layers of the touch sensing device 100 may be located on a side portion 103 outside the display screen 104 for been touched by a finger of a user. In FIG. 2, the electronic device includes a touch sensing device 200, a body 102, and a display screen 104. The touch sensing device 200 also includes a driving circuit 130 and a plurality of electrodes 110 with a plurality of layers. The layers of the touch sensing device 200 may be located on an area portion 203 of the display screen 104 for been touched by the finger of the user. In other words, the touch sensing electrode 112 of the touch sensor layer 111 is disposed on the display panel of the display screen 104. The difference between the touch sensing device 100 of FIG. 1 and the touch sensing device 200 of FIG. 2 is the locations of the layers and the electrodes. The structure of the layers in the touch sensing devices 100 and 200 are illustrated on the right portion of FIGS. 1 and 2. Those applying the present embodiment may adjust the locations of the layers and the electrodes on the body 102 or the display screen 104 according to their needs.

In the right portion of FIGS. 1 and 2, the layers include a touch sensor layer 111, a force sensor layer 113, a deformation layer 117, and a ground layer 115, and the electrodes include a touch sensing electrode 112, a force sensing electrode 114, and a ground voltage electrode 116 (i.e., a reference voltage electrode). The touch sensing electrode 112 is electrical connected to the touch sensor layer 111, the force sensor layer 113 is electrical connected to the force sensing electrode 114, and the ground layer 115 is electrical connected to the ground voltage electrode 116. In FIG. 2, the touch sensor layer 111 is on the display screen 104, and the force sensor layer 113 is below the display screen 104. The force sensor layer 111 and the touch sensor layer 113 are layered on each other on the same area (i.e., the area portion 203) of the display screen 104 in FIG. 2 or on the side portion 103 of the electronic device in FIG. 1. The touch sensing electrode 112 of the touch sensor layer 111 is disposed on a first plane of the force sensing electrode 114 of the force sensor layer 113, and the reference voltage electrode 116 of the ground layer 115 is disposed on a second plane of force sensing electrode 114 of the force sensor layer 113.

Those applying the present embodiment may use different type of the force sensor to implement the force sensor layer 113 according to their needs. For example, one type of the force sensor uses two upper and lower conductors and determines the upper and lower conductors are in contact or not to generate a force induction amount. Another type of the force sensor uses the deformation layer 117 and the force sensor layer 113, and determines the deformation layer 117 and the force sensor layer 113 are contact to the force sensor layer 113 or not to generate the force induction amount. In the first and second embodiments of FIGS. 1 and 2, the force sensor of the touch sensing devices 100 and 200 includes the deformation layer 117 and the force sensor layer 113. And, the touch sensor of the touch sensing devices 100 and 200 is implemented as a capacitive touch sensor.

The driving circuit 130 of FIGS. 1 and 2 may include a touch driving signal generator, a force driving signal generator, and a timing controller. The touch driving signal generator is coupled to the touch sensing electrode 112 for providing a touch driving signal to the touch sensor layer 111. The force driving signal generator is coupled to the force sensing electrode 114 for providing a force driving signal to the force sensor layer 113. The timing controller may control the touch driving signal generator and the force driving signal generator to control the timing or the pulse sequence of the touch driving signal, the force driving signal, and other signals for the display function, the touch sensing function, and the force sensing function of the touch sensing devices 100 and 200. The driving circuit 130 of FIGS. 1 and 2 may further include a reference voltage signal generator which coupled to the ground layer 115 for providing a force driving signal to the force sensor layer 113. Those applying the present embodiment may adjust the structures of the driving circuit 130 according to their needs. In some embodiments, the driving circuit 130 may be or integrated into a fingerprint, touch, and display drive integrated (FTDI) chip.

The driving circuit 130 determines that the finger of the user touches the touch sensing device 100 or 200 according to whether the result of the force sensing has the force induction amount in response to determine that the result of the touch sensing has the touch induction amount. And, the driving circuit 130 blocks or ignores the result of the touch sensing and determines that the finger of the user does not touch the touch sensing device 100 or 200 in response to determine that the result of the force sensing does not have the force induction amount.

To prevent accidental touch of the force sensor in the touch sensing devices 100 and 200, it has several methods being developed currently. In some embodiments, the accidental touch of the touch sensor is determined or checked by the force sensor. In detail, when there is a capacitance touch induction amount of the user's finger sensed by the touch sensor layer 111, it will determines that a force induction amount of the force sensor layer 113 is generated no not. If the force induction amount of the force sensor layer 113 is generated when the capacitance touch induction amount is sensed by the touch sensor layer 111, it is determined that the finger of the user has touched the touch sensor layer 111. Otherwise, if it is not determined that the force induction amount of the force sensor layer 113 is generated when the capacitance touch induction amount is sensed by the touch sensor layer 111, it is determined that the finger of the user do not touched the touch sensor layer 111, and the capacitance touch induction amount of the touch sensor layer 111 may be ignored or blocked, so as to prevent accidental touch of the touch sensing devices 100 and 200.

Figure 3:
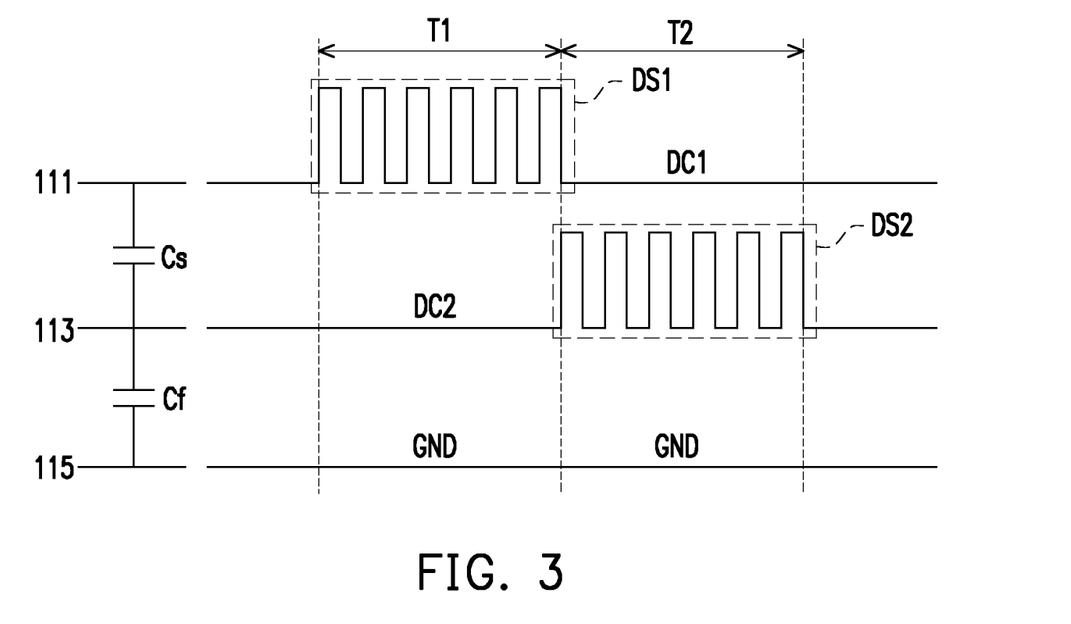
FIG. 3 is a waveform diagram of a touch sensing device with signals on the touch sensor layer, a force sensor layer, and a ground layer according to an embodiment.

FIG. 3 is a waveform diagram of a touch sensing device with signals on the touch sensor layer 111, a force sensor layer 113, and a ground layer 115 according to an embodiment. In FIG. 3, a parasitic capacitance Cs may appear between the touch sensor layer 111 and the force sensor layer 113, and a parasitic capacitance Cf may appear between the force sensor layer 113 and the ground layer 115. In period T1 of FIG. 3, the driving circuit 130 provides a first driving signal DS1 to the touch sensing electrode 112 of the touch sensor layer 111, provides a DC voltage DC2 to the force sensing electrode 114 of the force sensor layer 113, and provides a reference voltage (i.e., a ground voltage GND) to the ground voltage electrode 116 of the ground layer 115. Thus, in theory, a receiving terminal RX of the touch sensor will sense the capacitance touch induction amount of the parasitic capacitance Cs plus the capacitance touch induction amount of the parasitic capacitance Cf (marked as a capacitance amount 'Cs+Cf').

In period T2 of FIG. 3, the driving circuit 130 provides a second driving signal DS2 to the force sensing electrode 114 of the force sensor layer 113, provides a DC voltage DC1 to the touch sensing electrode 112 of the touch sensor layer 111, and provides the ground voltage GND to the ground voltage electrode 116 of the ground layer 115. Thus, in theory, a receiving terminal RX of the force sensor will sense the capacitance touch induction amount of the parasitic capacitance Cf (marked as a capacitance amount 'Cf'). And, the capacitance touch induction amount of the parasitic capacitance Cs will be known while by subtracting the capacitance amount 'Cs+Cf' from the capacitance amount 'Cf'. In some embodiments, the voltage level of the DC voltage DC2 may the same as the voltage level of the DC voltage DC1, and those applying the present embodiment may adjust the voltage levels of the DC voltage DC1 and the DC voltage DC2 according to their needs.

However, in the actual case, due to the touch sensor layer 111 and the force sensor layer 113 are integrated into one area and layered on each other on the same area (e.g., the side portion 103 of FIG. 1/the area portion 203 of FIG. 2), it may cause serious interference between the touch sensor layer 111, the force sensor layer 113, and further ground layer 115. In detail, while the first driving signal DS1 is provided to the touch sensor layer 111 in the period T1, the force sensing layer 113 also receives some interference signal affected by the parasitic capacitance Cs and the parasitic capacitance Cf, such that the capacitance amount 'Cs+Cf' sensed from the receiving terminal RX of the touch sensor may not accurate. And, while the second driving signal DS2 is provided to the force sensing layer 113 in the period T2, the touch sensor layer 1113 also receives some interference signal affected by the parasitic capacitance Cs and the parasitic capacitance Cf, such that the capacitance amount 'Cf' sensed from the receiving terminal RX of the force sensor may not accurate.

Figure 4:
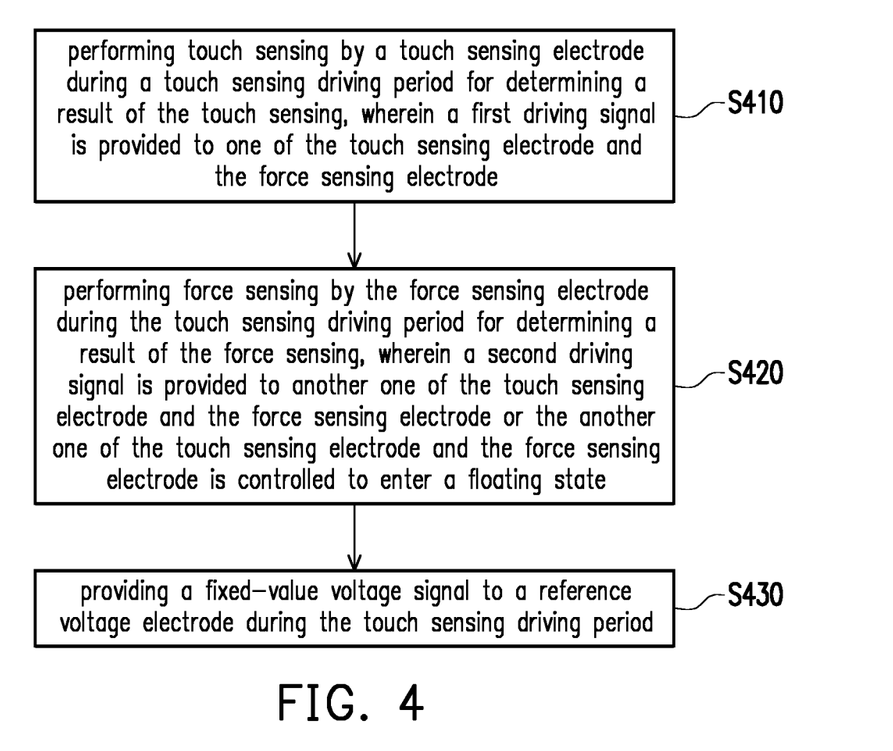
FIG. 4 is a flowchart of a driving method for driving the touch sensing device according to an embodiment of the invention.
Figure 5:
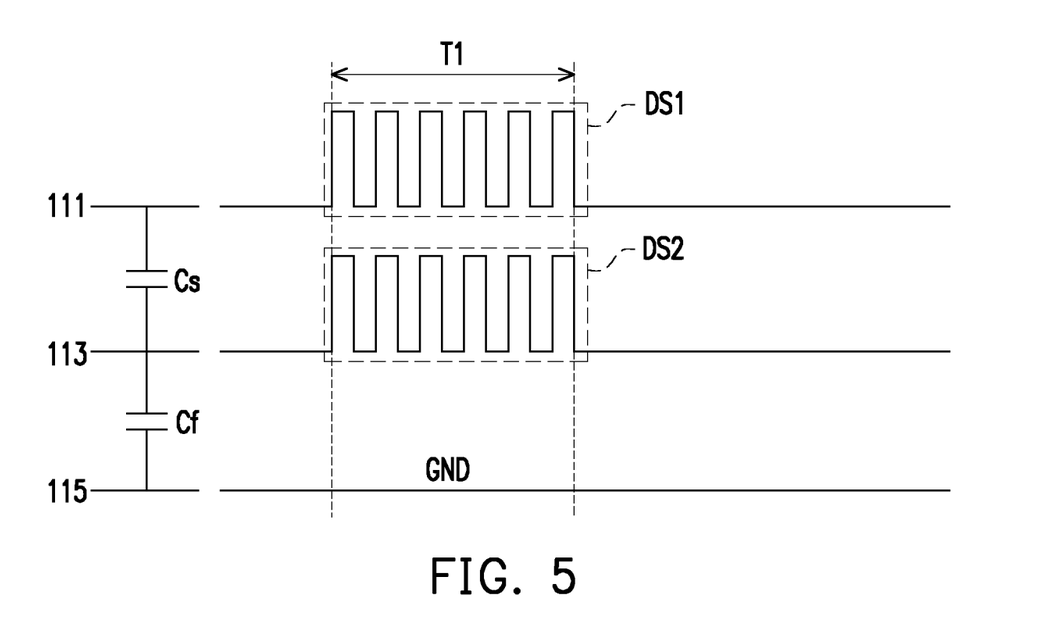
FIG. 5 is a waveform diagram of a touch sensing device with signals on the touch sensor layer, a force sensor layer, and a ground layer according to the third embodiment of the invention.

FIG. 4 is a flowchart of a driving method for driving the touch sensing device according to an embodiment of the invention. FIG. 5 is a waveform diagram of a touch sensing device with signals on the touch sensor layer 111, a force sensor layer 113, and a ground layer 115 according to the third embodiment of the invention. The driving method in FIG. 4 may be implemented using the touch sensing device 100 in FIG. 1 or the touch sensing device 200 in FIG. 2. For a detail description of the third embodiment of the invention, please refer to FIG. 1, FIG. 4, and FIG. 5 at the same time. In step S410 of FIG. 4, the driving circuit 130 performs touch sensing by the touch sensing electrode 111 during a touch sensing driving period T1 for determining a result of the touch sensing. And, the first driving signal DS1 is provided to one of the touch sensing electrode 111 and the force sensing electrode 113 during the touch sensing driving period T1. For performing the touch sensing in the third embodiment, the driving circuit 130 provides the first driving signal DS1 to the touch sensing electrode 111.

In step S420 of FIG. 4, the driving circuit 130 performs force sensing by the force sensing electrode 113 during the touch sensing driving period T1 for determining a result of the force sensing. And, the second driving signal DS2 is provided to another one of the touch sensing electrode 111 and the force sensing electrode 113 during the touch sensing driving period T1, or the another one of the touch sensing electrode 111 and the force sensing electrode 113 is controlled to enter a floating state. For performing the force sensing in the third embodiment, the driving circuit 130 provides the second driving signal DS2 to the force sensing electrode 113. In the third embodiment, the first driving signal DS1 and the second driving signal DS2 is a pulse signal with a pulse signal with a same frequency and a same phase. And, in the third embodiment, the first driving signal DS1 and the second driving signal DS2 have the same voltage level in each pulse. In some embodiments, the waveform type of the first driving signal DS1 and the second driving signal DS2 may be a square wave, a sine wave, a pulse waveform, etc.

In step S430 of FIG. 4, the driving circuit 130 further provides a fixed-value voltage signal (i.e., a DC voltage or a ground voltage GND) to the reference voltage electrode 116 of the ground layer 115 during the touch sensing driving period T1.

Based on above, during the touch sensing driving period T1, because the first driving signal DS1 and the second driving signal DS2 have the same phase, the same frequency and the same amplitude, or the first driving signal DS1 and the second driving signal DS2 have similar phase, similar frequency and similar amplitude, two terminals of the parasitic capacitance Cs have the same or similar voltage difference, thus the value of the parasitic capacitance Cs between the touch sensor layer 111 and the force sensor layer 113 is almost 0. If the user touches or approaches the touch sensor layer 111 by his or her finger during the touch sensing driving period T1, the change of the capacitance touch induction amount of the parasitic capacitance Cs sensed by the receiving terminal RX of the touch sensor will be very sensitive. Similarly, if the user touches or approaches the touch sensor layer 111 by his or her finger cause the deformation of the deformation layer 117 and the force sensing layer 115 during the touch sensing driving period T1, the change of the capacitance touch induction amount of the parasitic capacitance Cf sensed by the receiving terminal RX of the force sensor will be very sensitive. In other words, in the third embodiment of the invention, the parasitic capacitance Cs between the touch sensor layer 111 and the force sensor layer 113 will be reduced during the touch sensing driving period T1, thus the change of the capacitance touch induction amount of the parasitic capacitance Cs and the parasitic capacitance Cf will be very sensitive, so as to reduce the interference between the touch sensor layer 111 and the force sensor 113, increase the sensitivity of the signals of the touch sensor and the force sensor, and improve the function for of preventing accidental touch of the touch sensing device 100 of FIG. 1. In some embodiments, the touch sensing device 100 of FIG. 1 and the corresponding hardware structure in the third embodiment may be replaced as the touch sensing device 200 of FIG. 2, and the driving method for driving the touch sensing device 200 is also performed.

Figure 6:
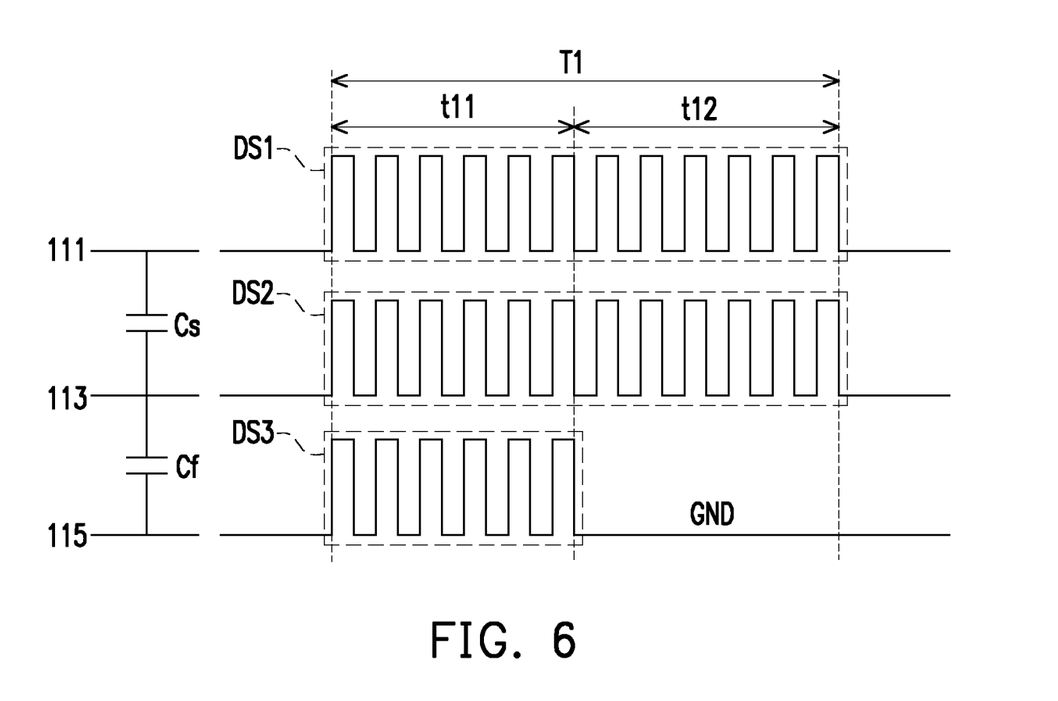
FIG. 6 is a waveform diagram of a touch sensing device with signals on the touch sensor layer, a force sensor layer, and a ground layer according to the fourth embodiment of the invention.

FIG. 6 is a waveform diagram of a touch sensing device with signals on the touch sensor layer 111, a force sensor layer 113, and a ground layer 115 according to the fourth embodiment of the invention. Please refer to FIG. 1, FIG. 4, and FIG. 6 at the same time for a detail description of the fourth embodiment of the invention. During the touch sensing driving period T1, the driving circuit 130 performs touch sensing by providing the first driving signal DS1 to the touch sensing electrode 111 for determining the result of the touch sensing in step S410. And, during the touch sensing driving period T1, the driving circuit 130 performs force sensing by providing the second driving signal DS2 to the force sensing electrode 113 for determining the result of the force sensing in step S420.

The main difference between the third embodiment of FIG. 5 and the fourth embodiment of FIG. 6 is, the touch sensing driving period T1 includes a first period t11 and a second period t12 in FIG. 6, and the ground layer 115 is provided different signals during the first period t11 and the second period t12. In detail, the first period t11 does not overlap with the second period t12, and the first period t11 is earlier than the second period t12. During the first period t11 of the touch sensing driving period T1, the driving circuit 130 provides the first driving signal DS1 to the touch sensing electrode 111, provides the second driving signal DS2 to the force sensing electrode 113, and provides a third driving signal DS3 to the reference voltage electrode (i.e., the ground layer 115). During the second period t12 of the touch sensing driving period T1, the driving circuit 130 provides the second driving signal DS2 to the force sensing electrode 113, provides the first driving signal DS1 to the touch sensing electrode 111, and provides a fixed-value voltage signal (i.e., the ground voltage GND) to the reference voltage electrode (i.e., the ground layer 115).

In the fourth embodiment, the first driving signal DS1 and the third driving signal DS3 have the same phase, the same frequency and the same amplitude, Thus, in the first period t11, two terminals of the parasitic capacitance Cf have the same or similar voltage difference, thus the value of the parasitic capacitance Cf between the force sensor layer 113 and the ground layer 115 will be reduced (may be reduced to almost 0). And, the capacitance amount 'Cf' sensed by the force sensor in the fourth embodiment of FIG. 6 is lower than the capacitance amount 'Cf' in the embodiment of FIG. 3. Hence, the change of the capacitance touch induction amount of the parasitic capacitance Cs sensed by the receiving terminal RX of the touch sensor will be very sensitive while the finger of the user approaches the force sensor layer 113 during the first period t11. The reason for providing the third driving signal DS3 on the ground layer 115 is to eliminate/reduce the influence affected by the stray capacitances/parasitic capacitances between the touch sensor layer 111 and the ground layer 115.

In the first period t12, the capacitance amount 'Cf' sensed by the force sensor will clearly be sensed. And, while the deformation of the deformation layer 117 are increased, the change of the capacitance amount 'Cf' sensed by the force sensor will easy and clearly to be sensed.

In some embodiments, the touch sensing device 100 of FIG. 1 and the corresponding hardware structure in the fourth embodiment may be replaced as the touch sensing device 200 of FIG. 2, and the driving method for driving the touch sensing device 200 is also performed.

Figure 7:
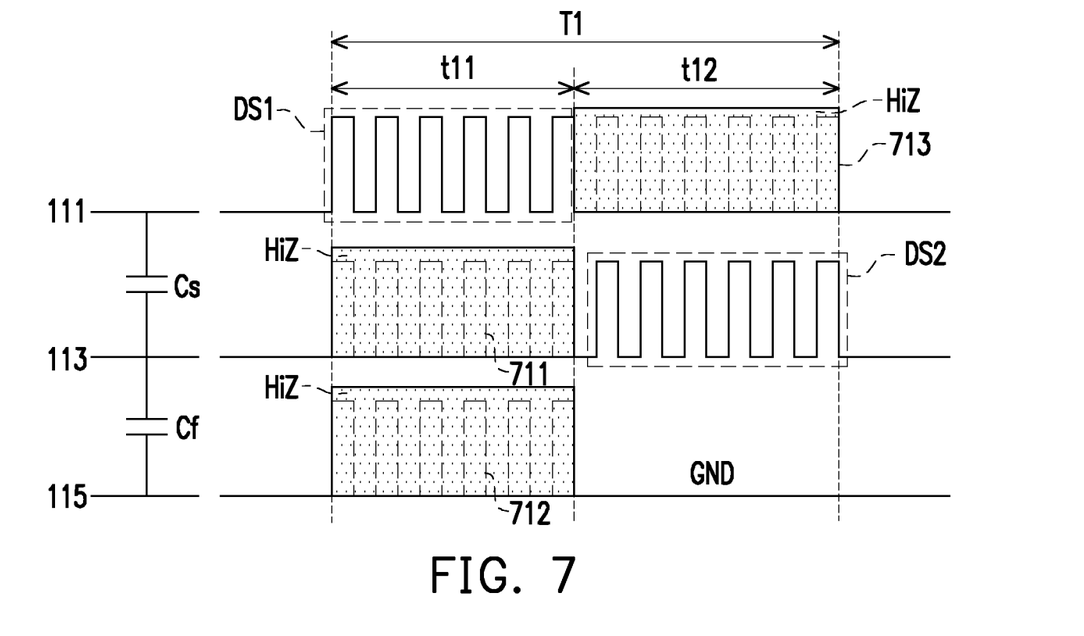
FIG. 7 is a waveform diagram of a touch sensing device with signals on the touch sensor layer, a force sensor layer, and a ground layer according to the fifth embodiment of the invention.

FIG. 7 is a waveform diagram of a touch sensing device with signals on the touch sensor layer 111, a force sensor layer 113, and a ground layer 115 according to the fifth embodiment of the invention. Please refer to FIG. 1, FIG. 4, and FIG. 7 at the same time for a detail description of the fifth embodiment of the invention. In FIG. 7, the touch sensing driving period T1 also includes the first period t11 and a second period t12. The main difference between the fourth embodiment of FIG. 6 and the fifth embodiment of FIG. 7 is, in the first period t11, the force sensing electrode 113 and the ground layer 115 are controlled to enter a floating state HiZ and the touch sensor layer 113 is controlled to enter the floating state HiZ in the second period t12. And, in the second period t12, the touch sensor layer 113 is controlled to enter the floating state HiZ.

In detail, during the first period t11, the driving circuit 130 provides the first driving signal DS1 to the touch sensing electrode 111, controls the force sensing electrode 113 to enter the floating state HiZ, and controls the reference voltage electrode (i.e., the ground layer 115) to enter the floating state HiZ during the first period t11. Due to parasitic capacitances between the touch sensor layer 111, the force sensor layer 113, and the ground layer 115, signals on these layers 111, 113, 115 may be affected by the coupling effect. Hence, during the first period t11, in a situation that the first driving signal DS1 is provided to the touch sensor layer 111 and the force sensor layer 113 and the ground layer 115 are floating (i.e., in the floating state HiZ), the signals of the force sensor layer 113 and the ground layer 115 will fluctuate with the first driving signal DS1, such as the signal 711 and the signal 712 with dotted line. Thus, the stray capacitances/parasitic capacitances between the touch sensor layer 111, the ground layer 115, and the ground layer 115 are eliminated/reduced during the first period t11. In the fifth embodiments, the signals 711 and 712 maybe a square wave or a pulse wave. In some embodiments, the signals 711 and 712 maybe have another shape as a sine wave, a triangle wave, etc. affected by the stray capacitances/parasitic capacitances, those applying the present embodiment may not limit thereof. If the user touches or approaches the touch sensor layer 111 by his or her finger during the first period t11 of the touch sensing driving period T1, the change of the capacitance touch induction amount of the parasitic capacitance Cs sensed by the receiving terminal RX of the touch sensor will be very sensitive.

During the first period t12, the driving circuit 130 provides the second driving signal DS2 to the force sensing electrode 113, controls the touch sensing electrode 111 to enter the floating state HiZ, and provides the fixed-value voltage signal (i.e., the ground voltage GND) to the reference voltage electrode (i.e., the ground layer 150). Hence, during the first period t12, in a situation that the second driving signal DS2 is provided to the force sensor layer 113 and the touch sensor layer 113 is floating (i.e., in the floating state HiZ), the signal of the touch sensor layer 111 will fluctuate with the second driving signal DS2, such as the signal 713 with dotted line. In some embodiments, the signals 713 maybe have another shape as a sine wave, a triangle wave, etc. affected by the stray capacitances/parasitic capacitances, those applying the present embodiment may not limit thereof. If the user touches or approaches the touch sensor layer 111 by his or her finger cause the deformation of the deformation layer 117 and the force sensing layer 115 during the second period t12 of the touch sensing driving period T1, the change of the capacitance touch induction amount of the parasitic capacitance Cf sensed by the receiving terminal RX of the force sensor will be very sensitive.

In some embodiments, the touch sensing device 100 of FIG. 1 and the corresponding hardware structure in the fifth embodiment may be replaced as the touch sensing device 200 of FIG. 2, and the driving method for driving the touch sensing device 200 is also performed in the fifth embodiment.

Figure 8:
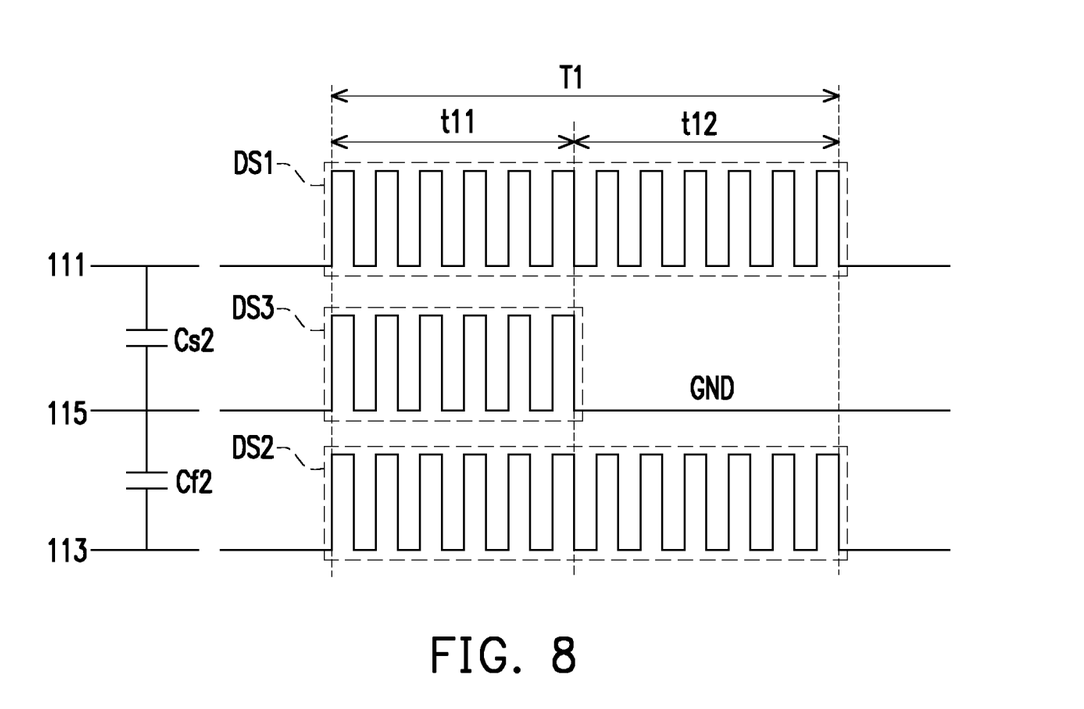
FIG. 8 is a waveform diagram of a touch sensing device with signals on the touch sensor layer, a force sensor layer, and a ground layer according to the sixth embodiment of the invention.

FIG. 8 is a waveform diagram of a touch sensing device with signals on the touch sensor layer 111, a force sensor layer 113, and a ground layer 115 according to the sixth embodiment of the invention. The main difference between the fourth embodiment of FIG. 6 and the sixth embodiment of FIG. 8 is, the ground layer 115 is between the touch sensor layer 111 and the force sensor layer 113. In other words, the structure of the layers 111, 113, and 115 may be adjusted, and the touch sensing device and the driving method of the fourth embodiment and the sixth embodiment are also well performed. In detail, the touch sensing electrode 112 of the touch sensor layer 111 is disposed on a first plane of the reference voltage sensing electrode of the ground layer 115, and the force sensing electrode 114 of the force sensor layer 113 is disposed on a second plane of reference voltage sensing electrode of the ground layer 115. The parasitic capacitance Cs2 may appear between the touch sensor layer 111 and the ground layer 115, and the parasitic capacitance Cf2 may appear between the ground layer 115 and force sensor layer 113. During the first period t11 of the touch sensing driving period T1, the driving circuit 130 provides the first driving signal DS1 to the touch sensing electrode 111, provides the second driving signal DS2 to the force sensing electrode 113, and provides a third driving signal DS3 to the reference voltage electrode (i.e., the ground layer 115). Thus, the change of the capacitance touch induction amount of the parasitic capacitance Cs2 sensed by the receiving terminal RX of the touch sensor will be very sensitive during the first period t11. During the second period t12 of the touch sensing driving period T1, the driving circuit 130 provides the second driving signal DS2 to the force sensing electrode 113, provides the first driving signal DS1 to the touch sensing electrode 111, and provides a fixed-value voltage signal (i.e., the ground voltage GND) to the reference voltage electrode (i.e., the ground layer 115). Thus, the change of the capacitance touch induction amount of the parasitic capacitance Cf2 sensed by the receiving terminal RX of the force sensor will be very sensitive during the second period t12.

Figure 9:
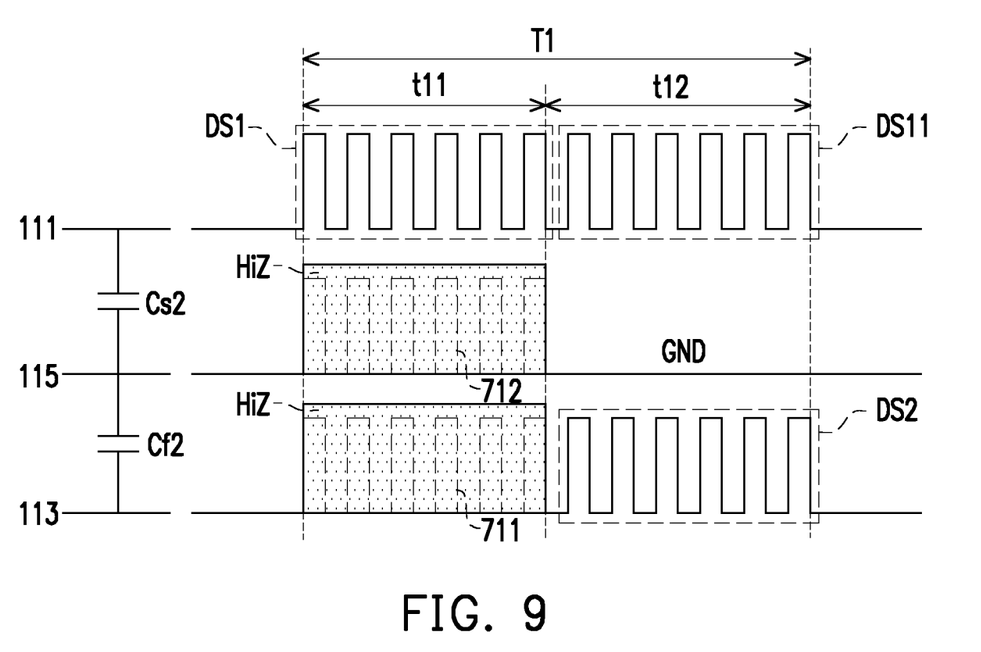
FIG. 9 is a waveform diagram of a touch sensing device with signals on the touch sensor layer, a force sensor layer, and a ground layer according to the seventh embodiment of the invention.

FIG. 9 is a waveform diagram of a touch sensing device with signals on the touch sensor layer 111, a force sensor layer 113, and a ground layer 115 according to the seventh embodiment of the invention. The first difference between the fifth embodiment of FIG. 7 and the seventh embodiment of FIG. 9 is, the ground layer 115 is between the touch sensor layer 111 and the force sensor layer 113. In other words, the structure of the layers 111, 113, and 115 may be adjusted, and the touch sensing device and the driving method of the fourth embodiment and the sixth embodiment are also well performed. The parasitic capacitance Cs2 may appear between the touch sensor layer 111 and the ground layer 115, and the parasitic capacitance Cf2 may appear between the ground layer 115 and force sensor layer 113. During the first period t11, the driving circuit 130 provides the first driving signal DS1 to the touch sensing electrode 111, controls the force sensing electrode 113 to enter the floating state HiZ, and controls the reference voltage electrode (i.e., the ground layer 115) to enter the floating state HiZ during the first period t11. Hence, during the first period t11, in a situation that the first driving signal DS1 is provided to the touch sensor layer 111 and the force sensor layer 113 and the ground layer 115 are floating (i.e., in the floating state HiZ), the signals of the force sensor layer 113 and the ground layer 115 will fluctuate with the first driving signal DS1, such as the signal 711 and the signal 712 with dotted line. And, the change of the capacitance touch induction amount of the parasitic capacitance Cs2 sensed by the receiving terminal RX of the touch sensor will be very sensitive during the first period t11.

The second difference between the fifth embodiment of FIG. 7 and the seventh embodiment of FIG. 9 is, in the second period t12, the driving circuit 130 provides the second driving signal DS2 to the force sensing electrode 113, and provides the first driving signal DS1 to the force sensing electrode 111. In the seventh embodiment of FIG. 9, the touch sensing electrode 111 do not controlled to enter the floating state HiZ. Hence, the touch sensor layer 111 and force sensor layer 113 have the driving signals accordingly. The change of the capacitance touch induction amount of the parasitic capacitance Cf2 sensed by the receiving terminal RX of the force sensor will be very sensitive during the second period t12.

Based on the above, the touch sensing device and the driving method for the touch sensing device of embodiments of the invention determine that a finger of a user touches the touch sensing device according to whether a result of the force sensing performed by a force sensor in response to determine that the result of the touch sensing has an touch induction amount, and ignore the result of the touch sensing and determines that the finger of the user does not touch the touch sensing device in response to determine that the result of the force sensing does not have the force induction amount. And, when driving the touch sensor layer of the touch sensor and the force sensor layer of the touch sensor at the same time, a parasitic capacitance between the touch sensor layer and the force sensor layer is reduced by adjusting driving signals of the force sensor layer and the touch sensor layer. Therefore, in the present embodiment, the interference between the touch sensor layer and the force sensor is reduced, the sensitivity of the signals of the touch sensor and the force sensor is increased, and the function for of preventing accidental touch is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch sensing device, comprising:
 a plurality of electrodes, the electrodes comprising:
  a touch sensing electrode;
  a force sensing electrode, adjacently coupled to the touch sensing electrode; and
  a reference voltage electrode, adjacently coupled to the touch sensing electrode and the force sensing electrode; and
 a driving circuit, coupled to the touch sensing electrode and the force sensing electrode,
 wherein the driving circuit performs touch sensing by the touch sensing electrode during a touch sensing driving period for determining a result of the touch sensing, and performs force sensing by the force sensing electrode during the touch sensing driving period for determining a result of the force sensing,
wherein during the touch sensing driving period, the driving circuit provides a first driving signal to one of the touch sensing electrode and the force sensing electrode, provides a second driving signal to another one of the touch sensing electrode and the force sensing electrode or controls the another one of the touch sensing electrode and the force sensing electrode to enter a floating state,
wherein the touch sensing driving period includes a first period and a second period, the first period does not overlap with the second period, and the first period is earlier than the second period,
wherein the driving circuit provides the first driving signal to the touch sensing electrode, provides the second driving signal to the force sensing electrode or controls the force sensing electrode to enter the floating state, and provides a third driving signal to the reference voltage electrode or controls the reference voltage electrode to enter the floating state during the first period, and
the driving circuit provides the second driving signal to the force sensing electrode, provides the first driving signal to the touch sensing electrode or controls the touch sensing electrode to enter the floating state, and provides a fixed-value voltage signal to the reference voltage electrode during the second period.

2. The touch sensing device of claim 1, wherein the first driving signal and the second driving signal is a pulse signal with a pulse signal with a same frequency and a same phase.

3. The touch sensing device of claim 1, wherein the first driving signal and the second driving signal is a pulse signal with a pulse signal with a same frequency, a same phase, and a same voltage level.

4. The touch sensing device of claim 1, wherein the driving circuit provides a fixed-value voltage signal to the reference voltage electrode during the touch sensing driving period.

5. The touch sensing device of claim 1, wherein the first driving signal and the third driving signal is a pulse signal with a pulse signal with a same frequency and a same phase.

6. The touch sensing device of claim 1, wherein the first driving signal and the third driving signal is a pulse signal with a pulse signal with a same frequency, a same phase, and a same voltage level.

7. The touch sensing device of claim 1, wherein the touch sensing electrode is disposed on a first plane of the force sensing electrode, and the reference voltage electrode is disposed on a second plane of the force sensing electrode.

8. The touch sensing device of claim 1, wherein the touch sensing electrode is disposed on a first plane of the reference voltage sensing electrode, and the force sensing electrode is disposed on a second plane of the reference voltage electrode.

9. The touch sensing device of claim 1, wherein the touch sensing electrode is disposed on a display panel, the display panel is disposed on a first plane of the reference voltage electrode, and the force sensing electrode is disposed on a second plane of the reference voltage electrode.

10. The touch sensing device of claim 1, wherein the driving circuit determines that a finger of a user touches the touch sensing device according to whether the result of the force sensing has an force induction amount in response to determine that the result of the touch sensing has an touch induction amount, and, the driving circuit blocks or ignores the result of the touch sensing and determines that the finger of the user does not touch the touch sensing device in response to determine that the result of the force sensing does not have the force induction amount.

11. A driving method for driving a touch sensing device, wherein the touch sensing device includes at least a plurality of electrodes, the electrodes include a touch sensing electrode, a force sensing electrode and a reference voltage electrode that is adjacently coupled to the touch sensing electrode and the force sensing electrode, and the driving method comprising:
performing touch sensing by the touch sensing electrode during a touch sensing driving period for determining a result of the touch sensing; and
performing force sensing by the force sensing electrode during the touch sensing driving period for determining a result of the force sensing,
wherein during the touch sensing driving period, a first driving signal is provided to one of the touch sensing electrode and the force sensing electrode, a second driving signal is provided to another one of the touch sensing electrode and the force sensing electrode or the another one of the touch sensing electrode and the force sensing electrode is controlled to enter a floating state,
wherein the touch sensing driving period includes a first period and a second period, the first period does not overlap with the second period, and the first period is earlier than the second period, and
the step for providing the first driving signal to one of the touch sensing electrode and the force sensing electrode, providing a second driving signal to another one of the touch sensing electrode and the force sensing electrode or controlling the another one of the touch sensing electrode and the force sensing to enter the floating state comprising:
providing the first driving signal to the touch sensing electrode, providing the second driving signal to the force sensing electrode or controlling the force sensing electrode to enter the floating state, and providing a third driving signal to the reference voltage electrode or controlling the reference voltage electrode to enter the floating state during the first period; and
providing the second driving signal to the force sensing electrode, providing the first driving signal to the touch sensing electrode or controlling the touch sensing electrode to enter the floating state, and providing a fixed-value voltage signal to the reference voltage electrode during the second period.

12. The driving method of claim 11, wherein the first driving signal and the second driving signal is a pulse signal with a pulse signal with a same frequency and a same phase.

13. The driving method of claim 11, wherein the first driving signal and the second driving signal is a pulse signal with a pulse signal with a same frequency, a same phase, and a same voltage level.

14. The driving method of claim 11, further comprising:
providing a fixed-value voltage signal to the reference voltage electrode during the touch sensing driving period.

15. The driving method of claim 11, wherein the first driving signal and the third driving signal is a pulse signal with a pulse signal with a same frequency and a same phase.

16. The driving method of claim 11, wherein the first driving signal and the third driving signal is a pulse signal with a pulse signal with a same frequency, a same phase, and a same voltage level.

17. The driving method of claim 11, further comprising:
   determines that a finger of a user touches the touch sensing device according to whether the result of the force sensing has an force induction amount in response to determine that the result of the touch sensing has an touch induction amount; and
   blocking or ignoring the result of the touch sensing and determining that the finger of the user does not touch the touch sensing device in response to determine that determine that the result of the force sensing does not have the force induction amount.

* * * * *